United States Patent [19]

Clark

[11] 4,203,425

[45] May 20, 1980

[54] INFLATABLE SOLAR COLLECTOR

[76] Inventor: Dana A. Clark, Washburn Rd., Barre, Mass. 01005

[21] Appl. No.: 929,217

[22] Filed: Jul. 31, 1978

[51] Int. Cl.² .................................................. F24J 3/02
[52] U.S. Cl. ...................................... 126/426; 126/445; 126/450
[58] Field of Search ............... 126/270, 271; 237/1 A; 34/93

[56] References Cited

U.S. PATENT DOCUMENTS

| | | | |
|---|---|---|---|
| 3,949,095 | 4/1976 | Pelehach et al. | 126/271 |
| 4,015,582 | 4/1977 | Liu et al. | 126/270 |
| 4,109,640 | 8/1978 | Smith | 126/271 |
| 4,126,270 | 11/1978 | Hummel | 126/270 |

Primary Examiner—James C. Yeung

Attorney, Agent, or Firm—Howard I. Podell

[57] ABSTRACT

A solar collector using air as its heat transfer medium having a top member containing a plurality of transparent sealed air pockets allowing passage of radiant energy but preventing conductive and convective heat losses generated inside the collector; a central black-coated absorbent plastic member divides the center of the collector into a plurality of interconnected inflatable upper and lower chambers connected to air pumps at one end and to a constriction valve outlet at the other. The lower end of the lower chambers consists of a cover containing a multiplicity of insulative sealed air channels. The collector can be mounted on a turntable frame having adjustable reflective panels mounted above and below the collector. The heated air after it has given up its calories to a storage unit is recirculated to the inflatable chambers.

3 Claims, 6 Drawing Figures

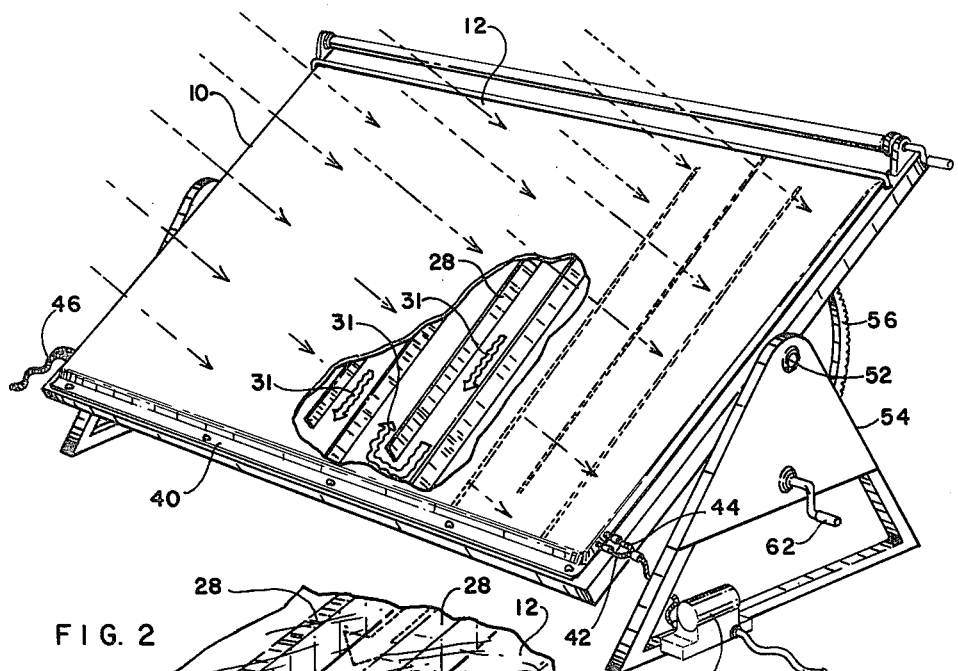
FIG. 1
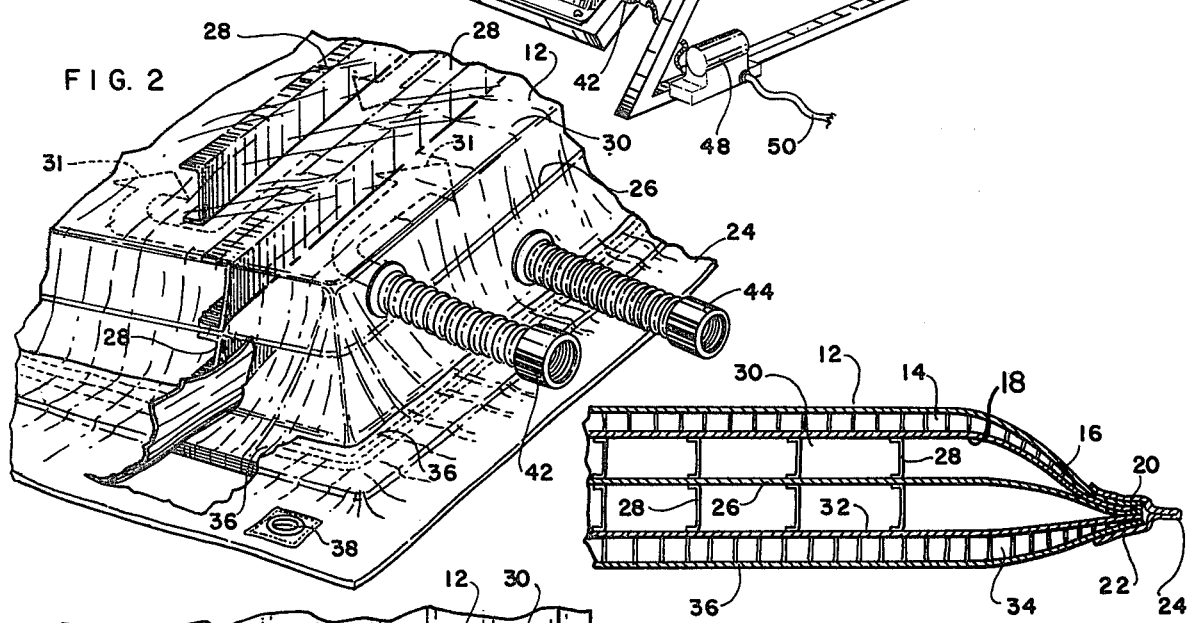
FIG. 2
FIG. 4
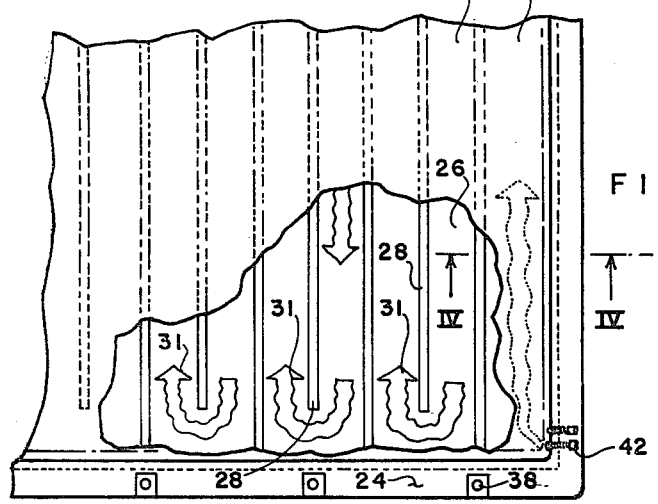
FIG. 3

INFLATABLE SOLAR COLLECTOR

FIELD OF THE INVENTION:

This invention relates generally to a solar collector structure through which air is pumped to collect heat therefrom.

DESCRIPTION OF THE PRIOR ART:

The prior art, as exemplified by U.S. Pat. Nos. 4,029,077; 4,027,437; 4,022,186; 4,004,380; 3,998,204 and 4,026,268 is generally illustrative of the pertinent art but the aforementioned patents are non-applicalbe to the present invention. While the prior art expedients are generally acceptable for their intended purposes only, they have not proven entirely satisfactory in that they are either complex and expensive to manufacture, or bulky and inconvenient to use or to operate. As a result of the shortcomings of the prior art, typified by the above, there has developed a substantial need for improvement in this field.

The principal object of this invention is to provide a device or article of this character which combines simplicity, strength and durability in a high degree, together with inexpensiveness of construction owing to a minimum of parts so as to encourage widespread use thereof.

Additional objects and advantages of the invention will be set forth in part in the description which follows and in part will be obvious from the description, or may be realized by practice of the invention, the objects and advantages being realized and attained by means of the instrumentalities and combinations particularly pointed out in the appended claims.

SUMMARY OF THE INVENTON

This invention resides in a solar collector using air as its heat transfer medium having a top member containing a plurality of transparent sealed air pockets allowing passage of radiant energy but preventing conductive and convective heat losses generated inside the collector; a central black-coated absorbent plastic member divides the center of the collector into a plurality of interconnected inflatable upper and lower chambers connected to air pumps at one end and to a constriction valve outlet at the other. The lower end of the lower chambers consists of a cover containing a multiplicity of insulative sealed air channels. The collector can be mounted on a turntable frame having adjustable reflective panels mounted above and below the collector. The heated air after it has given up its calories to a storage unit is recirculated to the inflatable chambers.

BRIEF DESCRIPTION OF THE DRAWING

In the accompanying drawing, in which is shown one of the various possible illustrative embodiments of this invention, wherein like reference character identify the same or like parts:

FIG. 1 is a view perspective of the collector of the invention mounted on an orientable frame;

FIG. 2 is a partial view of the collector with parts broken away to show details of construction;

FIG. 3 is a partial plan view thereof;

FIG. 4 is a cross-sectional view taken along line 4—4 of FIG. 3;

Figure 5:
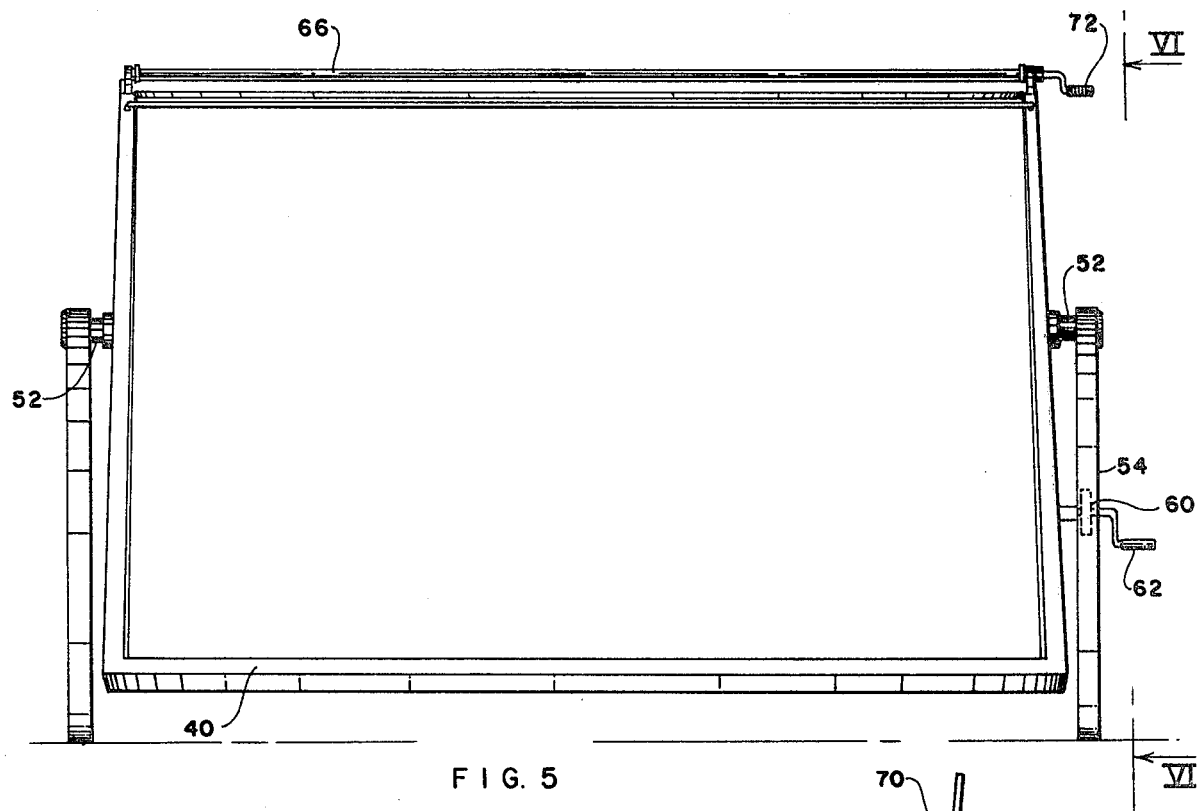
FIG. 5 is a front elevational view of the adjustable frame for the collector.

DESCRIPTION OF THE PREFERRED EMBODIMENTS:

With reference to the drawing, there is shown and illustrated a solar collector constructed in accordance with the principles of the invention and designated generally by reference character 10. The illustrated tangible embodiment of the invention includes a top transparent, flat flexible chamber 12 containing a multiplicity of sealed insulative air pockets 14 (FIG. 4) and formed of two sheets 16, 18 of transparent vinyl or silicone material which are hermetically heat sealed between the upper and lower inner ends 20, 22 of plastic frame member 24.

A plastic sheet 26 painted black with for example a carbon black paint and spaced from sheet 18 by black painted spacers 28 sealed thereto. Spacers 28 as shown in FIGS. 2, 3, 4 are of different and staggered lengths so as to provide a multiplicity of consecutive interconnected air channels 30 providing a flow pattern shown by arrows 31.

Similar spacers 28 are secured between heat absorbent plastic 26 and black or white painted plastic sheet 32 which together with bottom sheet 36 form a multiplicity of consecutive connected air channels 30. The bottom of the unit is formed by a sheet of plastic 36 with a multiplicity of insulative air pockets 34 therebetween to reduce heat losses by conduction and/or convection.

The ends of all the plastic sheets are heat sealed or bonded between the ends 20, 22 of plastic frame 24 which has grommetted openings 38 along its periphery for securing the unit to a supporting frame 40 by screws or other convenient means.

Air inlet means 42, 44 communicate, respectively, with the upper and lower air chambers and to an air pump for forcing air through the air channels 30. The air passes through the unit as shown by arrows 31 to constriction valve outlet 46. This valve is adjustable to allow air flow out of the unit while allowing the buildup of sufficient back pressure to keep the unit inflated against the force of the pump.

The radiant heat of the sun passes through top layer 12 and heats the black layer 26. In turn, air passing through channels 30 is heated by conduction from the black surface and transmitted by convection through outlet 46 to a storage unit containing a heat exchange medium which removes calories from the hot air. The thus cooled air then is recirculated to the pump 48 through tubing 50.

The collecting unit described above may be rolled up when not in use and unrolled for use in front of a structure.

Figure 6:
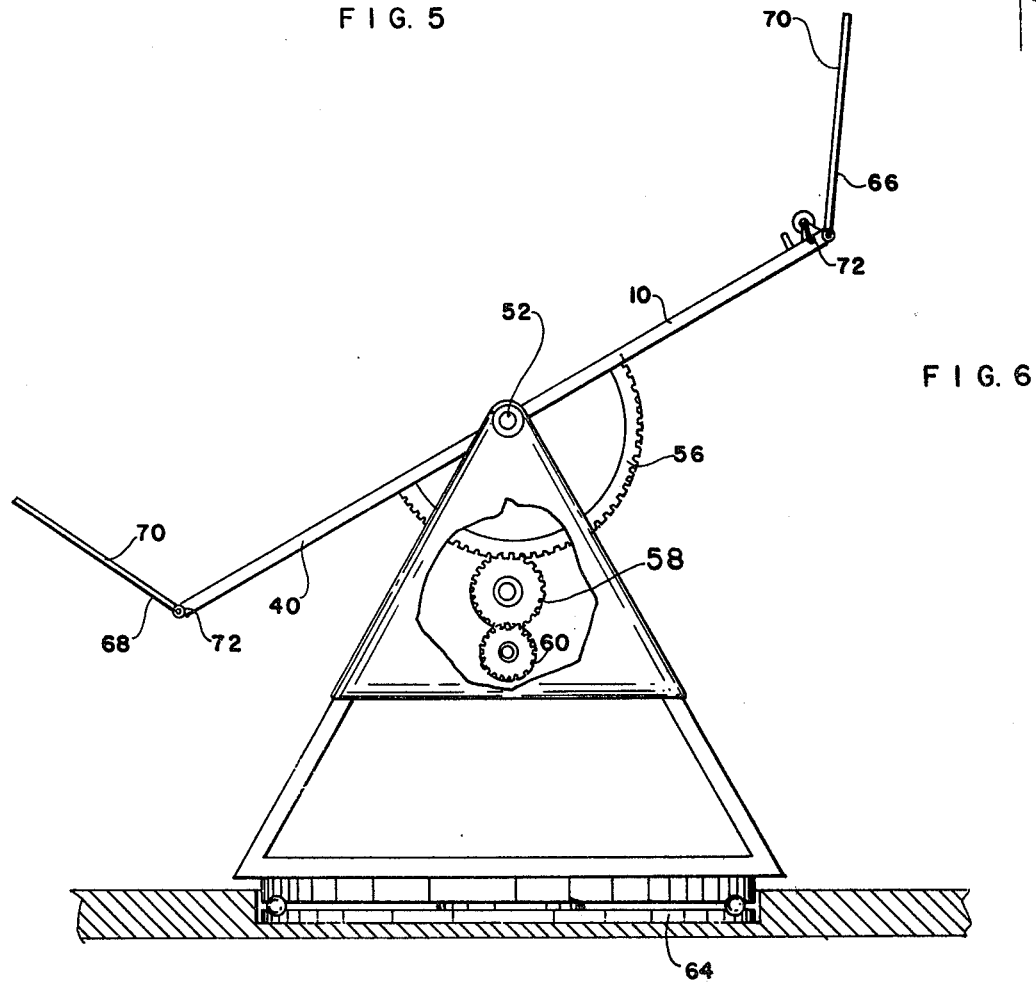
FIG. 6 is a side view, partly broken away showing the frame in open or operative position.

As shown in FIGS. 5, 6, the collector unit 10 can be pivoted by pivot 52 to the apex of triangular frame 54. A semicircular gear element 56 is fixed to the underside of collector frame 40 to mesh with multiplying gears 58, 60 connected to crank 62 for changing the vertical angle of collector 10 to maximize the angle of incidence of the sun's rays and thus optimize heat production.

Frame 54 is suitably mounted on turntable 64 to track the sun.

For better efficiency, reflective panels 66, 68 are hinged above and below the collector frame 40. These panels also form doors which protect the collector unit when not in use, in commercial or residential buildings. The inner surface 70 of the panels is metallized with aluminum for greater reflectivity. The turn table may be motorized by well known means such as a motor.

Means are provided on the hinges such as set screws 72 for maintaining the angular distance between the collector 10 and the panels which are about half its area at an angle of one-hundred-twenty to one-hundred-twenty-seven degrees. This design adds an excess of fifty percent of the total surface area of collection thus increasing proportionately its efficiency.

The operation and use of the invention hereinabove described will be evident to those skilled in the art to which it relates from a consideration of the foregoing.

The present invention is believed to accomplish among others all of the objects and advantages herein set forth.

Without further analyses, the foregoing will so fully reveal the gist of this invention that those skilled in the art can by applying current knowledge thereto readily adapt it for various applications without omitting certain features which can constitute essential characteristics of the generic or specific aspects of this invention. Therefore, a more lengthy description is deemed unnecessary.

It is intended that various changes may be made in this invention in the practical development thereof, if desired. Such changes are comprehended within the meaning and range of equivalency of the following claims. The invention, therefore, is not to be restricted except as is necessitated by the prior art.

Having thus described the invention, what is claimed as new and to be secured by Letters Patent is:

1. An inflatable solar heat collector unit in which air may be circulated under pressure as a heat collecting medium and a means of inflating the collector unit, comprising an assembly of flexible plastic sheets joined together by spacers formed of flexible plastic sheet material such that the said flexible plastic sheets are spaced apart from each other to bound a continuous air chamber when the assembly is inflated, comprising a first insulating outer section formed of a first pair of spaced transparent plastic sheets, said first pair of spaced plastic sheets joined together by a plurality of spacers of transparent plastic so as to form a multiplicity of separate sealed air pockets, a second insulating outer section formed of a second pair of spaced transparent plastic sheets, said second pair of spaced plastic sheets joined together by a plurality of spacers of transparent plastic so as to form a multiplicity of separate sealed air pockets except as noted herein, said first and second insulating outer sections being each joined by flexible plastic spacers to opposed sides of a central heat collecting flexible plastic sheet which is of an opaque color, such as black, so as to absorb radiant solar heat; said spacers joined to the said central sheet being of different lengths located so as to form at least one continuous passage of consecutive air channels in an air chamber on each side of the central sheet, said air chambers being joined so as to form one continuous passage for air which is fed into a first said air chamber from an inlet joined to said chamber and led from the second air chamber from an outlet connected thereto, an adjustable constriction valve mounted to said outlet so as to create a controlled amount of back pressure in said first and second chambers so as to cause the said chambers to be inflated with a desired volume of air so as to space the central heat collector sheet from both outer insulating sections when air is pumped into the inlet of said first chamber by pump means, such that the air pumped into the device by the said pump means serves to inflate the structure while the air is heated by radiant energy absorbed by the central sheet, with said heated air then led from said outlet and serving to transfer heat from the central sheet to exterior exchange means.

2. The invention as recited in claim 1 in which at least one plastic sheet of the second insulating outer section is of an opaque color such as white, so as to reflect heat coming from the collector sheet back to the collector sheet.

3. The invention as recited in claim 1 together with a peripheral plastic frame, in which all said sheets are joined together at their periphery so as to lie adjacent to each other, with the common periphery of all sheets joined to said plastic frame, said plastic frame being fitted with means to fasten to external support frame means.

* * * * *